(12) United States Patent
Peng

(10) Patent No.: US 11,545,180 B1
(45) Date of Patent: Jan. 3, 2023

(54) HEAT-ASSISTED MAGNETIC RECORDING HEAD WITH A NEAR-FIELD OSCILLATOR PAIR

(71) Applicant: Seagate Technology LLC, Freemont, CA (US)

(72) Inventor: Chubing Peng, Eden Prairie, MN (US)

(73) Assignee: Seagate Technology LLC, Fremont, CA (US)

(*) Notice: Subject to any disclaimer, the term of this patent is extended or adjusted under 35 U.S.C. 154(b) by 0 days.

(21) Appl. No.: 17/356,419

(22) Filed: Jun. 23, 2021

(51) Int. Cl.
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,045,422 B2 | 10/2011 | Komura et al. | |
| 8,369,192 B1 | 2/2013 | Komura et al. | |
| 8,619,516 B1 | 12/2013 | Matsumoto | |
| 8,958,668 B2 | 2/2015 | Peng et al. | |
| 9,449,626 B2 | 9/2016 | Lee et al. | |
| 10,121,496 B1 | 11/2018 | Peng et al. | |
| 10,770,098 B1 | 9/2020 | Peng | |
| 2007/0274193 A1* | 11/2007 | Akiyama | G11B 9/1409 369/126 |
| 2008/0191122 A1* | 8/2008 | Hongo | G11B 5/02 250/201.5 |
| 2009/0219638 A1* | 9/2009 | Iwata | G11B 5/3903 360/59 |
| 2009/0303858 A1* | 12/2009 | Kuiseko | G11B 7/1384 |

* cited by examiner

*Primary Examiner* — Peter Vincent Agustin

(57) ABSTRACT

A heat-assisted magnetic recording head includes a near-field transducer (NFT). The NFT includes a plasmonic disk and a near-field oscillator pair. The near-field oscillator pair includes a receiving oscillator and an emitting oscillator. The receiving oscillator is operatively coupled to the plasmonic disk and configured to receive localized surface plasmons from the plasmonic disk and amplify a near field of the localized surface plasmons. The emitting oscillator is configured to receive the near field from the receiving oscillator and emit the near field toward a surface of a magnetic disk.

20 Claims, 14 Drawing Sheets

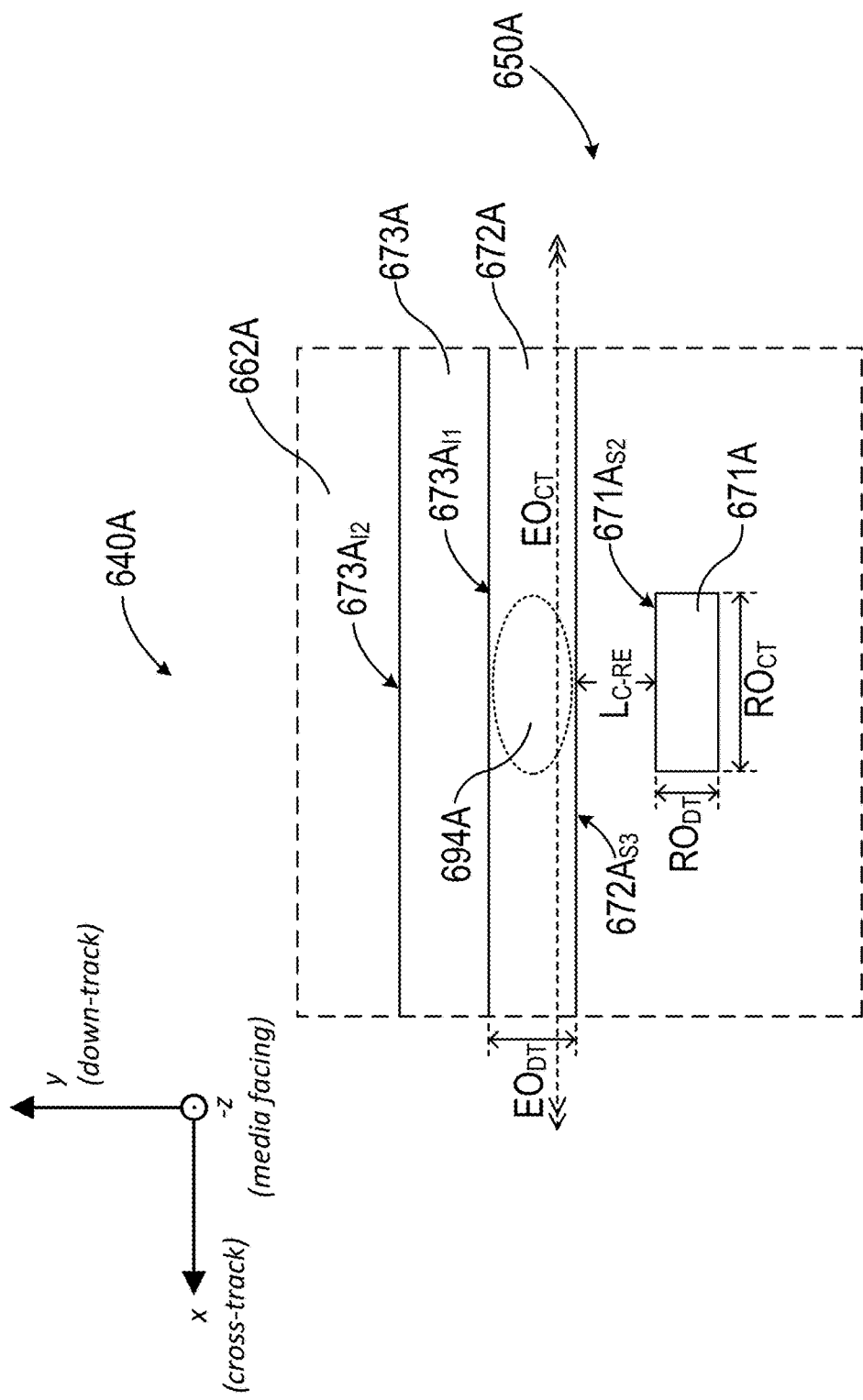

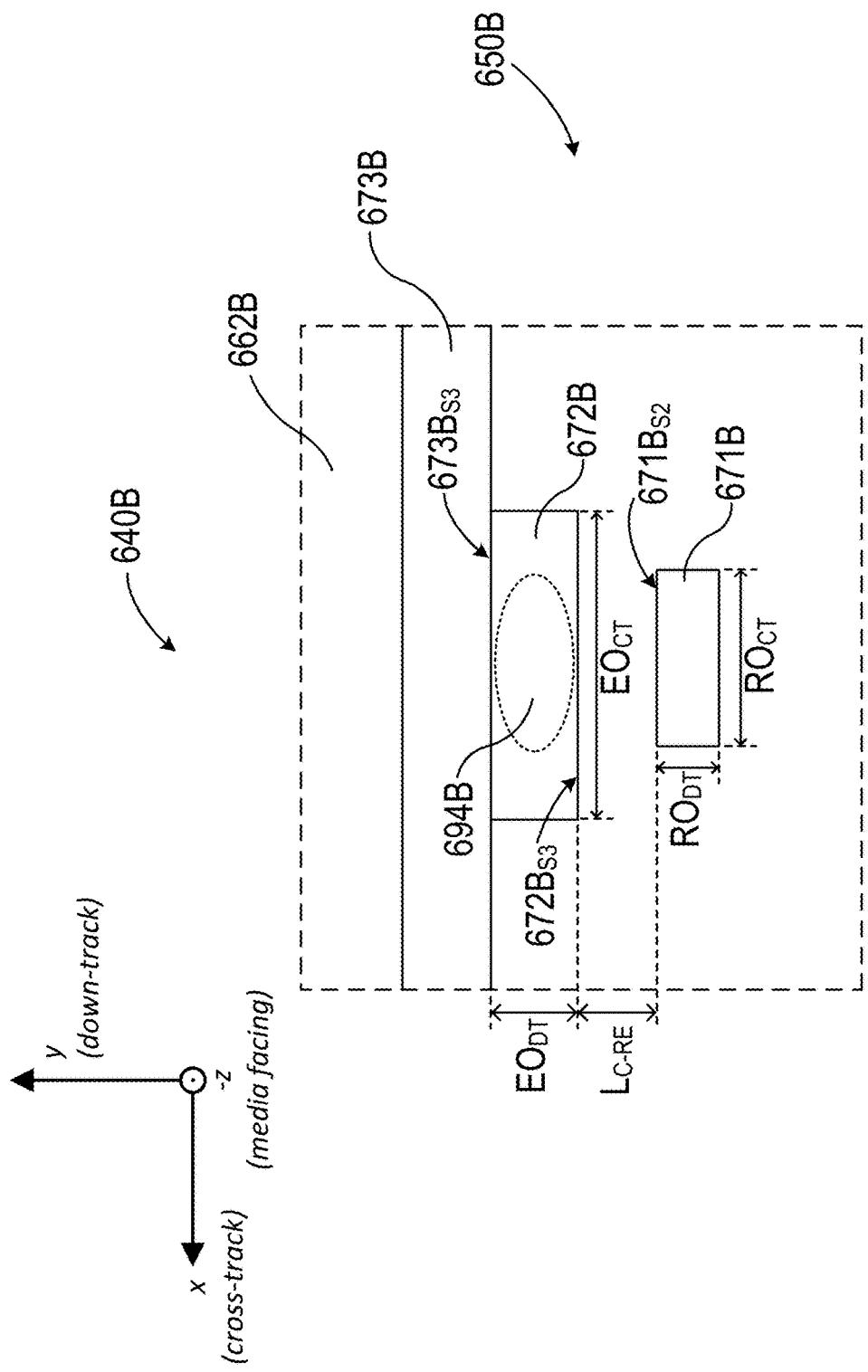

HEAT-ASSISTED MAGNETIC RECORDING HEAD WITH A NEAR-FIELD OSCILLATOR PAIR

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The areal density of the magnetic disk is limited by the size of the hot spot generated by the NFT and the thermal gradient of the hot spot. Moreover, the NFT produces enormous amounts of heat which may degrade various components of the recording head, thus potentially reducing the life expectancy of the recording head and the HDD.

SUMMARY

The present disclosure describes a heat-assisted magnetic recording (HAMR) head which includes a near-field transducer (NFT) comprising a pair of near-field oscillators. The pair includes a receiving oscillator and an emitting oscillator. The receiving oscillator is coupled to one or more disks of the NFT and functions to condense a generated localized surface plasmon (LSP) distribution, amplify the LSP near field, and transfer the amplified near field in a down-track direction to the emitting oscillator. The emitting oscillator emits the near field onto a surface of a magnetic disk. In contrast to example HAMR heads that include a traditional near-field emitter such as a peg, the inclusion of a near-field oscillator pair in a HAMR head may provide an advantage of better heat dissipation, lower operating temperature of the NFT (and/or other HAMR head features), and/or lower operating laser power. In this way, techniques of this disclosure may provide better reliability and/or longer lifetime of the HAMR head. Additionally, the inclusion of a pair of near-field oscillators may provide a HAMR head with higher near-field thermal gradient than a HAMR head that includes a traditional near-field emitter, which may enable smaller bits to be written and thus a higher areal density capability (ADC) of the HAMR HDD.

In one example, a HAMR head includes an NFT including a plasmonic disk and a near-field oscillator pair, the near-field oscillator pair including a receiving oscillator operatively coupled to the plasmonic disk and configured to receive localized surface plasmons from the plasmonic disk and amplify a near field of the localized surface plasmons, and an emitting oscillator configured to receive the near field from the receiving oscillator and emit the near field toward a surface of a magnetic disk.

In another example, a HAMR head includes a plasmonic disk; a heat-sink disk; a near-field oscillator pair including a receiving oscillator and an emitting oscillator; and an electric field barrier, wherein the plasmonic disk, the heat-sink disk, the receiving oscillator, and the emitting oscillator each include a surface which is substantially parallel to the media-facing air-bearing surface, and wherein each surface is a length equal to or greater than zero from the media-facing air-bearing surface.

These and other features and aspects of various examples may be understood in view of the following detailed discussion and accompanying drawings.

BRIEF DESCRIPTION OF THE DRAWINGS

FIGS. 6A-6C are views parallel to an air-bearing surface of an example HAMR head, in accordance with aspects of this disclosure.

DETAILED DESCRIPTION

Figure 1:
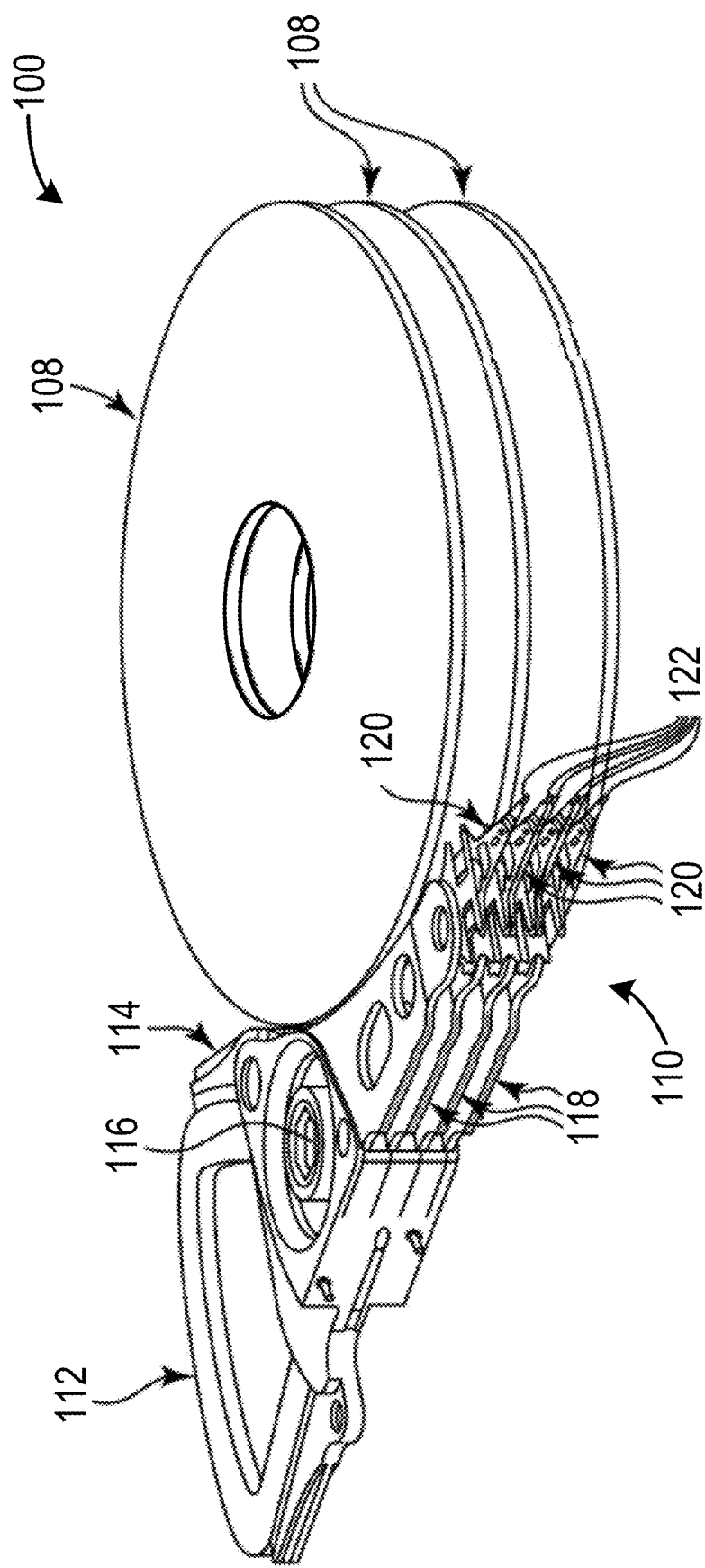
FIG. 1 is a perspective view of an example hard disk drive, in accordance with aspects of this disclosure.

FIG. 1 is a perspective view of an example heat assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head configured to read data from and write data to a storage layer of a respective magnetic disk 108.

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108. Each HAMR head of sliders 122 includes a plurality of active components that are configured to perform or assist in writing data to and/or reading data from a magnetic disk 108. Examples of active components include a writer, a reader, a heater (e.g., a read heater or a write heater), and a near-field transducer (NFT).

Figure 2:
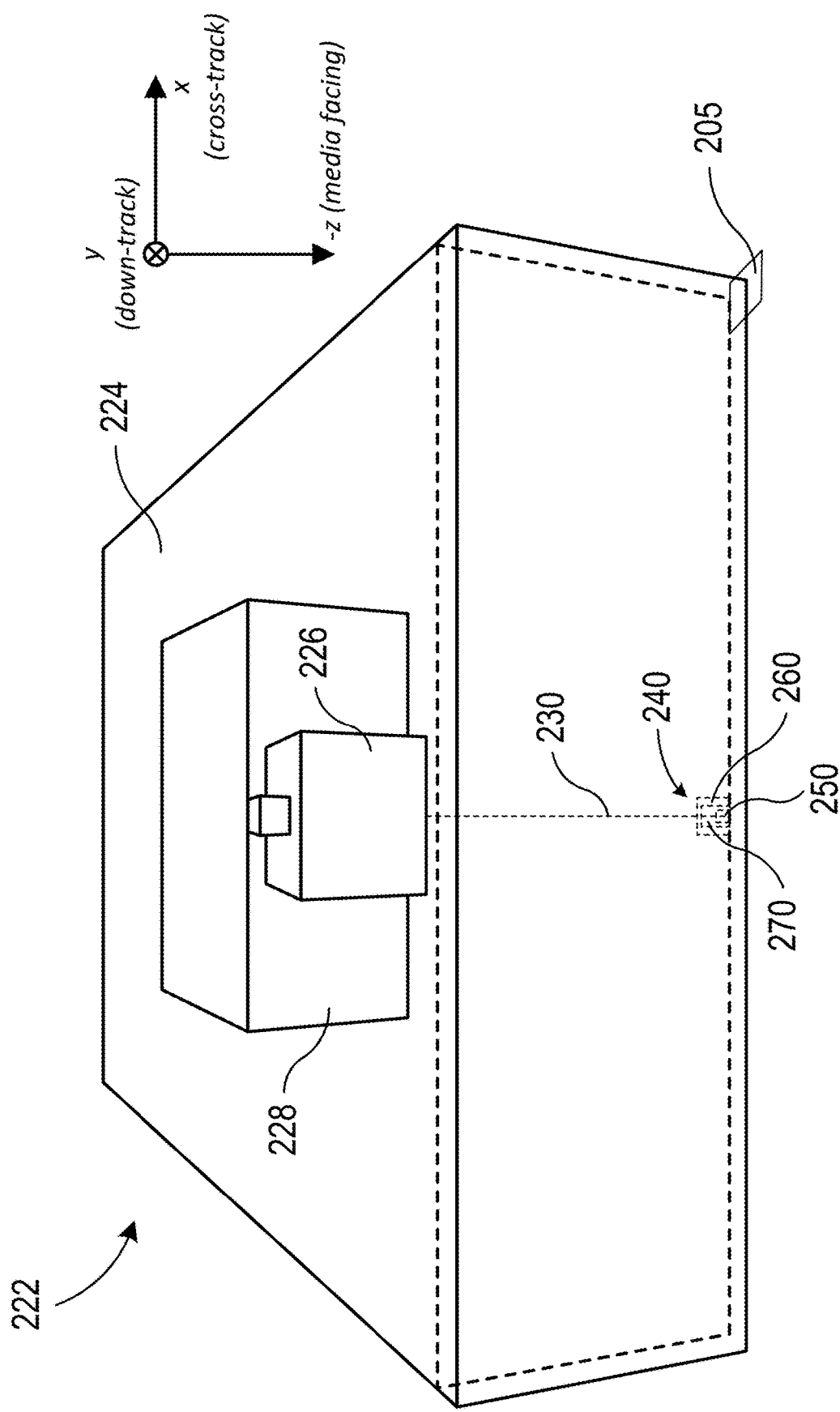
FIG. 2 is a perspective view of an example heat-assisted magnetic recording (HAMR) slider, in accordance with aspects of this disclosure.

FIG. 2 is a perspective view of an example HAMR slider 222, in accordance with aspects of this disclosure. Slider 222 may be an example of slider 122 of FIG. 1. Slider 222 includes a slider body 224, a laser 226, a submount 228, a waveguide 230, and a HAMR head 240. HAMR head 240 includes a near-field transducer (NFT) 250, a writer 260, and a reader 270. In the example of FIG. 2, some features or parts of features of NFT 250, writer 260, and reader 270 (e.g., features such as a peg of NFT 250, a write pole of writer 260, a free layer and a pinned layer of reader 270), are presented on a media-facing air-bearing surface (ABS) 205 that is positioned over a surface of a magnetic disk (not shown) during some operations of the HDD. During such operations, ABS 205 faces and is held proximal to the moving magnetic disk surface by a cushion of gas, known as an active air bearing (AAB), that is produced from a dynamic flow of gas across a pattern of recessed subsurfaces bound within the volume of slider body 224 by ABS 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. Submount 228 may be configured to redirect photons output from laser 226 so that the photons are directed into waveguide 230 in the negative z-direction of FIG. 2. The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to generate and support a distribution of localized surface plasmons (LSPs) upon receiving incident photons from laser 226 by way of waveguide 230 and condense the LSP distribution on an area or feature of NFT 250. NFT 250 amplifies and focuses near-field energy of the LSP distribution on a spot on a surface of a magnetic disk (e.g., a magnetic disk 108 of FIG. 1). Writer 260 is configured to generate a magnetic field from an electrical current and aim the magnetic field at an area of the magnetic disk which includes the spot of focused near-field energy of the LSP distribution of NFT 250. The near-field energy of the LSP distribution heats and lowers the coercivity of the magnetic grains in the spot of focus, thereby enabling these magnetic grains to be oriented by the magnetic field of writer 260. Turning off laser 226 or moving NFT 250 toward a different location of the magnetic disk (or moving the magnetic disk such that NFT 250 faces a different location of the magnetic disk) removes the focused near-field energy from the spot on the magnetic disk, allowing the magnetic grains to cool and thereby locking in the grain orientation, and thus bits of written data, induced by the magnetic field from writer 260.

In accordance with examples of this disclosure, HAMR head 240 includes a near-field transducer including a plasmonic disk and a near-field oscillator pair, as described below with reference to FIGS. 3-6C. The near-field oscillator pair includes a receiving oscillator and an emitting oscillator. The receiving oscillator is operatively coupled to the plasmonic disk. The receiving oscillator is configured to receive localized surface plasmons from the plasmonic disk, amplify a near field of the localized surface plasmons, and transfer the amplified near field to the emitting oscillator. The emitting oscillator is configured to receive the near field from the receiving oscillator and emit the near field toward a surface of a magnetic disk. Utilizing a near-field oscillator pair may enable HAMR head 240 to displace the emitted near field from the receiving oscillator (which is thermally coupled to a relatively small volume for heat dissipation) to the emitting oscillator (which is coupled to a relatively large volume for heat dissipation), thereby potentially dissipating heat more effectively. In some scenarios, utilizing the receiving oscillator to generate the near field and displacing the near field to the emitting oscillator may enable HAMR head 240 to provide a lower operating temperature and/or increase the thermal gradient of the hot spot on a magnetic disk surface. Lower operating temperature may maintain the structural integrity of the HAMR head components (e.g., reducing the likelihood of failure of various components of the HAMR head) and potentially extend the lifespan of the HAMR head. Increasing the thermal gradient may enable smaller data bits to be written, which may enable higher areal density capability (ADC) of the HAMR HDD.

Figure 3:
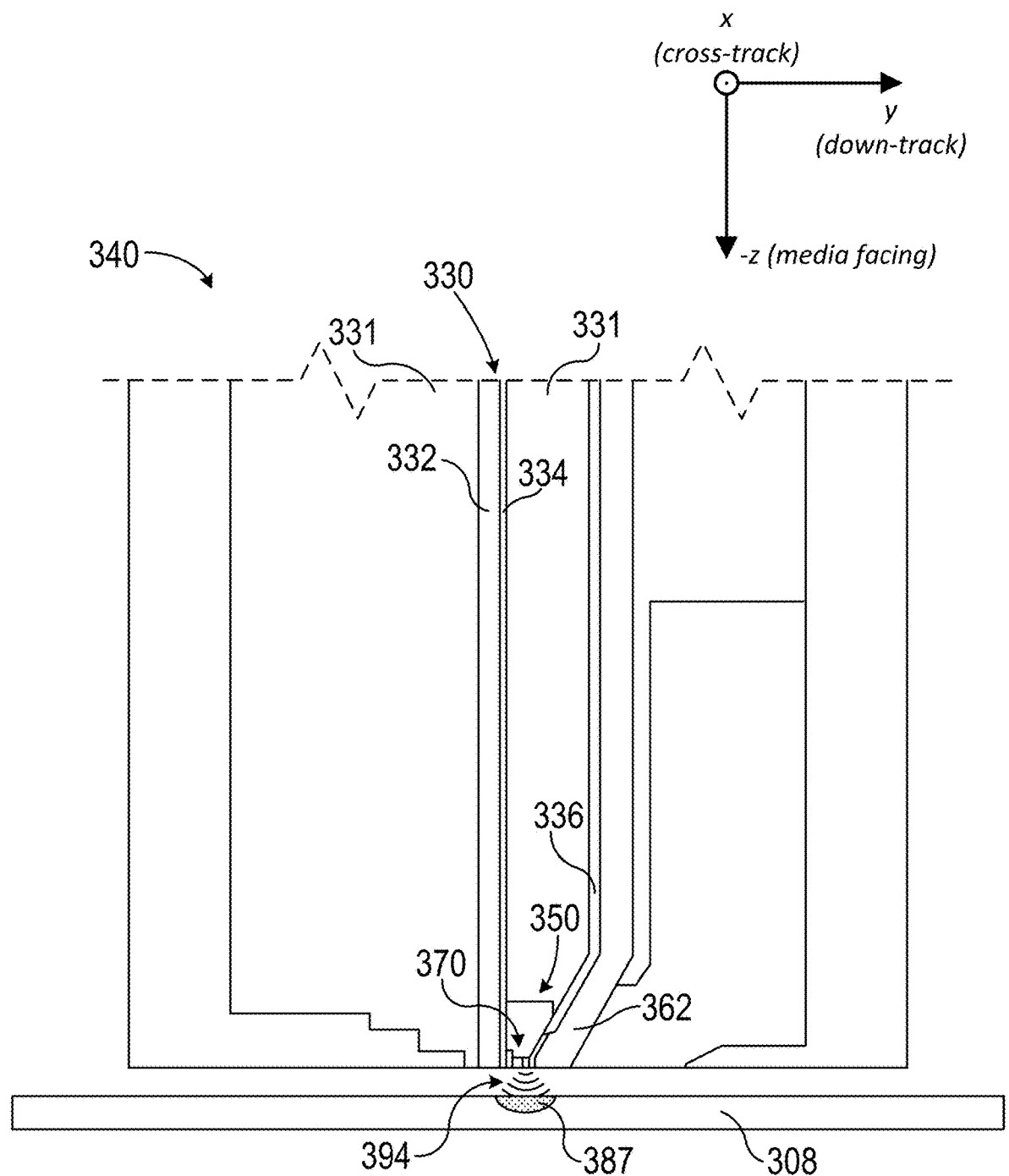
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, cladding layers 331, an NFT 350, a diffuser 336, and a write pole 362.

A light source, such as laser 226 of FIG. 2, emits photons of a target wavelength range (e.g., near infrared, visible). In some instances, laser 226 emits a distribution of photons with a median wavelength of 800 nm to 900 nm. Optical layers such as waveguide 330 and cladding layers 331 are configured to support LSP generation on NFT 350 by directing photons from the light source toward NFT 350. In some examples, a waveguide includes at least two layers that include different materials. In one example, a material of the first layer has a refractive index that is different than the refractive index of a material of the second layer. In some examples, the momentum of an incident photon in a first material is shifted upon transmission into a second material, which may be caused by the difference in the refractive indices of the materials of the first and second layers. Waveguide 330, for example, includes a waveguide core 332 and a core-to-NFT spacing (CNS) layer 334.

LSPs are generated on NFT 350 through resonance coupling of photons from the light source with free electrons of NFT 350. NFT 350 includes near field oscillator pair 370, which is configured to condense LSPs of NFT 350, amplify a near field of the LSPs, and emit a near field 394 to heat a spot 387 on magnetic disk 308. Near field 394 and a magnetic field from write pole 362 are directed to be partially coincident on spot 387 such that the temperature increase resulting from the absorption of near field 394 by a storage layer of magnetic disk 308 reduces the magnetic coercivity of the grains within spot 387. The lower magnetic coercivity within spot 387 enables the magnetic field from write pole 362 to orient them more easily, thus producing more stable bits of written data.

LSPs are be generated on NFT 350. In some instances, LSPs are generated on a plasmonic region of NFT 350, such as a surface, feature, and/or disk. NFT 350 may include a plasmonic metal that enables and supports LSP generation. As used herein, a plasmonic metal is a metal which possesses properties (e.g., electrical properties, optical properties) which promote resonance coupling between photons incident upon the plasmonic metal and free electrons of the plasmonic metal. Such resonant coupling of a photon with free electrons of the plasmonic metal excites one or more plasmonic modes of the plasmonic metal, which results in the generation of an LSP on a surface of the plasmonic metal. Examples of plasmonic metals include gold, silver, ruthenium, copper, aluminum, rhodium, and combinations thereof.

Plasmonic metals which demonstrate efficient plasmon generation are said to have a high plasmonic figure of merit. Plasmonic metals which demonstrate high plasmonic figures of merit and are thus common in HAMR NFTs (e.g., gold) are often prone to thermal defects, instability, and degradation at temperatures which are encountered by the HAMR head under normal operating conditions. Repeated and prolonged thermal exposure of the NFT may lead to thermal degradation, physical defects, deformation, and/or recession of its features. Such degradation and defects may reduce the performance and/or shorten the lifetime of a HAMR head, as well as increase the laser power required to maintain the LSP density needed for HDD operation and further accelerate defect formation and migration. Providing a thermal spot with a high thermal gradient in down-track and cross-track dimensions of a proximate magnetic disk to achieve high ADC is often in conflict with the goal of extending lifetime through efficient heat dissipation.

In accordance with aspects of the current disclosure, near-field oscillator pair 370 provides means of generating a near field on one portion of NFT 350 and emitting a near field from a different portion of NFT 350 that is less isolated than the first portion (e.g., isolated by having less area of contact with other surrounding features). Generating the near field on a first portion of NFT 350 that is relatively isolated may increase the thermal gradient of spot 387 on magnetic disk 308. Displacing the near field from a second portion of NFT 350 that is less isolated than the first portion may enable NFT 350 to dissipate heat more efficiently (e.g., through diffuser 336 and write pole 362).

Figure 4:
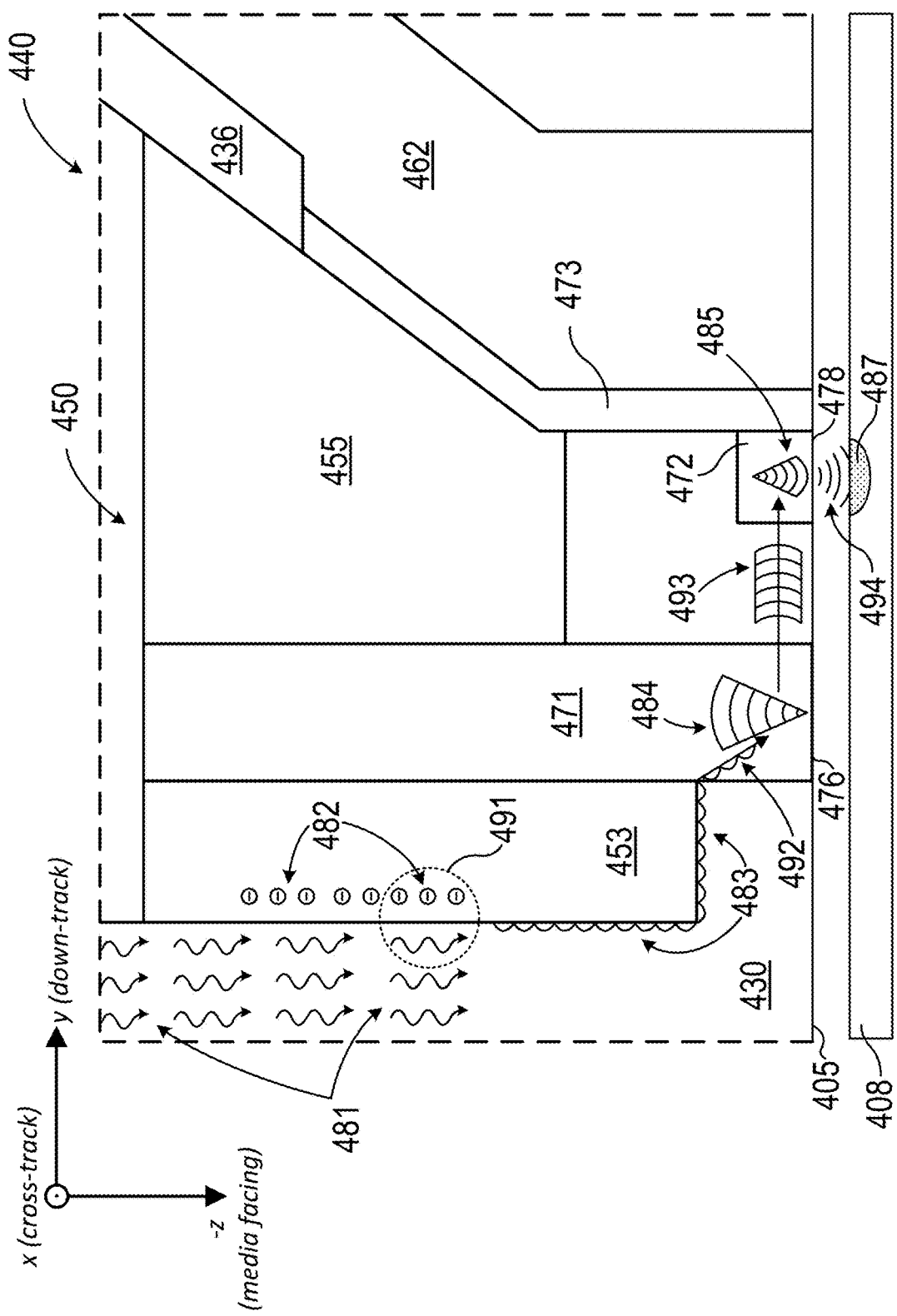
FIG. 4 is a schematic cross-sectional view of an example HAMR head, in accordance with aspects of this disclosure.

FIG. 4 is a schematic cross-sectional view of an example HAMR head, in accordance with aspects of this disclosure. HAMR head 440 is placed in proximity to a magnetic disk 408. HAMR head 440 includes write pole 462, diffuser 436, and NFT 450.

Waveguide 430 is configured to transmit photons from a light source (e.g., laser 226 of FIG. 2) toward NFT 450 and couple the transmitted photons to a feature or features of NFT 450 in order to generate LSPs through resonance coupling of the photons with free electrons of NFT 450. In some examples, waveguide 430 is configured as a planar waveguide or channel waveguide. Waveguide 430 may include dielectric materials (e.g., aluminum oxide, silicon dioxide, niobium oxide, tantalum pentoxide).

Waveguide 430 includes dimensions and features which shift the momentum vector (i.e., the k vector) of the incident photons from a laser or other light source so that a component of the k vector of an incident photon of a given frequency (i.e., w) which is parallel to a waveguide 430/NFT 450 interface matches the momentum vector k of an associated LSP mode of the given frequency ω. In one example, a waveguide includes gratings with periodic patterns which can shift (e.g., increase) a momentum of an incident photon. In other examples, a waveguide includes multiple layers of materials of different refractive indices, where a momentum of an incident photon in a first material of a first refractive index is shifted upon transmission into a second material of a second refractive index. Waveguide 430, for example, may include a waveguide core and a core-to-NFT spacing (CNS) layer. A waveguide core may include a first dielectric material (e.g., niobium oxide) of a first refractive index, and a CNS layer may include a second dielectric material (e.g., aluminum oxide, silicon dioxide) of a second refractive index. Such features and structures of waveguide 430 manipulate a momentum component of an incident photon from a laser or other light source and match the momentum component to a momentum component of a surface plasmon mode of NFT 450 such that photons directed by waveguide 430 couple to free electrons of NFT 450 and excite one or more LSP resonance modes.

NFT 450 includes a plasmonic disk 453, a receiving oscillator 471, an emitting oscillator 472, an electric field barrier 473, and a heat sink 455. Receiving oscillator 471 is coupled to plasmonic disk 453 and heat sink 455. Emitting oscillator 472 is coupled to electric field barrier 473. The volume between emitting oscillator 472 and receiving oscillator 471 may be occupied by a material. In some examples, the volume between emitting oscillator 472 and receiving oscillator 471 is occupied by a dielectric material (e.g., silicon dioxide, aluminum oxide). Electric field barrier 473 is coupled to heat sink 455, write pole 462, and diffuser 436.

Receiving oscillator 471 and emitting oscillator 472 are disposed proximal to air-bearing surface 405. Air-bearing surface 405 is a media-facing surface which faces magnetic disk 408. Receiving oscillator 471 includes a surface 476 which is proximate to air-bearing surface 405. In some examples, surface 476 of receiving oscillator 471 is substantially parallel to and coincident with the air-bearing surface 405. Emitting oscillator 472 includes a surface 478 which is proximate to air-bearing surface 405. In some examples, surface 478 of emitting oscillator 472 is substantially parallel to and coincident with air-bearing surface 405.

Plasmonic disk 453 is configured to generate LSPs through coupling with incident photons 481. Plasmonic disk 453 may include a plasmonic metal, such as gold. Free electrons 482 of plasmonic disk 453 couple to incident photons 481 (coupling 491) to produce a distribution of LSPs 483.

Receiving oscillator 471 and emitting oscillator 472 are configured to promote the transfer of amplified near field 484 from receiving oscillator 471 to emitting oscillator 472 (near field transfer 493). For example, receiving oscillator 471 is configured receive LSPs 483 from plasmonic disk 453 (LSP transfer 492), condense the distribution of LSPs 483, and amplify a near field 484 of the LSP distribution. The condensation of LSPs 483 and amplification of near field 484 may take place in a region of receiving oscillator 471 that is near air-bearing surface 405. This region of receiving oscillator 471 may be structured as a protrusion from NFT 450, and thus may be narrow relative to other features as plasmonic disk 453 and the region of receiving oscillator 471 which is distal to air-bearing surface 405. The width of this protrusion region of receiving oscillator 471 may enhance the amplification of near field 484. Emitting oscillator 472 is configured to receive near field transfer 493 from receiving oscillator 471 and emit transferred near field 485 (emission 494) to produce a hot spot 487 on magnetic disk 408.

In some instances, optical properties of receiving oscillator 471, emitting oscillator 472, and/or electric field barrier 473 enable near field transfer 493. Examples of optical properties include the refractive index n and/or optical extinction coefficient k. Receiving oscillator 471 includes a material having a first set of optical properties, such as a refractive index $n_{RO}$ and optical extinction coefficient $k_{RO}$. Emitting oscillator 472 includes a material having an optical extinction coefficient $k_{EO}$ and receiving oscillator 471 may include a different material having a different optical extinction coefficient $k_{RO}$. In some examples, the optical extinction coefficient $k_{EO}$ is lower than an optical extinction coefficient $k_{RO}$. In some examples, optical extinction coefficient $k_{EO}$ that is less than or equal to about 4.

In some examples, emitting oscillator 472 includes a material having a refractive index $n_{EO}$ that is less than or equal to about 1. Receiving oscillator 471 may include a material having a refractive index $n_{RO}$. An emitting oscillator optical ratio $R_{EO}$ may be defined as optical extinction coefficient $k_{EO}$ divided by refractive index $n_{EO}$. A receiving oscillator optical ratio $R_{RO}$ may be defined as optical extinction coefficient $k_{RO}$ divided by refraction index $n_{RO}$. In some examples, $R_{EO}$ is greater than $R_{RO}$. In some examples, the difference in optical ratios $R_{EO}$ and $R_{RO}$ enables near-field transfer 493 from receiving oscillator 471 to emitting oscillator 472.

Electric field barrier 473 is coupled to emitting oscillator 472 and is configured to confine transferred near field 485 to emitting oscillator 472 after emitting oscillator 472 receives transferred near field 485. Optical properties (e.g., refractive index n, extinction coefficient k) of materials included in receiving oscillator 471, emitting oscillator 472, and/or electric field barrier 473 may enable the confinement of transferred near field 485 to emitting oscillator 472. In some examples, electric field barrier 473 includes a material having an optical extinction coefficient k that is larger than an optical extinction coefficient k of one or more materials of emitting oscillator 472. In one example, electric field barrier 473 includes a material having an optical extinction coefficient k that is greater than or equal to about 6.

Transferring amplified near field 484 to emitting oscillator 472 displaces a portion of the generated heat, enabling the heat to be dissipated through more efficient paths. Specifically, emitting oscillator 472 is coupled to electric field barrier 473, and electric field barrier 473 is coupled to write pole 462 and diffuser 436. The volume of write pole 462 and diffuser 436 may provide paths for more efficient heat dissipation than the isolated portion of receiving oscillator 471 where amplified near field 484 is generated.

FIGS. 5A-5D are cross-sectional views of example HAMR heads, in accordance with aspects of this disclosure. HAMR head 540A includes a waveguide 530A, an NFT 550A, a write pole 562A, and a diffuser 536A. NFT 550A includes a plasmonic disk 553A, a heat sink 555A, a receiving oscillator 571A, an electric field barrier 573A, and an emitting oscillator 572A. Plasmonic disk 553A is disposed proximate to and coupled to a core-to-NFT spacing (CNS) layer 534A of waveguide 530A. Receiving oscillator 571A is disposed between and is operatively coupled to plasmonic disk 553A and heat sink 555A. Electric field barrier 573A is disposed proximate to and is coupled to write pole 562A and diffuser 536A. Emitting oscillator 572A is disposed proximate to and is coupled to electric field barrier 573A.

Each of plasmonic disk 553A, receiving oscillator 571A, heat sink 555A, and emitting oscillator 572A includes a surface which is proximate to media-facing air-bearing surface 505A (surfaces $553A_{S1}$, $571A_{S1}$, $555A_{S1}$, and $572A_{S1}$, respectively). Each of surfaces $553A_{S1}$, $571A_{S1}$, $555A_{S1}$, and $572A_{S1}$ may be recessed from air-bearing surface 505A by recess lengths $PD_{rec}$, $RO_{rec}$, $HS_{rec}$, and $EO_{rec}$, respectively. In some examples, one or more of surfaces $553A_{S1}$, $571A_{S1}$, $555A_{S1}$, and $572A_{S1}$ is substantially parallel to air-bearing surface 505A. In some instances, one or more of surfaces $553A_{S1}$, $571A_{S1}$, $555A_{S1}$, and $572A_{S1}$ are not recessed from air-bearing surface 505A. In such instances, the associated recess length is zero.

Receiving oscillator 571A is defined by a height ROOT in the down-track (y) dimension of HAMR head 540A. Emitting oscillator 572A is defined by a height $EO_{DT}$ in the down-track (y) dimension of HAMR head 540A. Emitting oscillator 572A includes a surface $572A_{S2}$ which is substantially parallel to surface $572A_{S1}$ and is recessed from surface $572A_{S1}$ by length $EO_z$. That is, emitting oscillator 572A is defined by an emitting oscillator length $EO_z$ in a dimension z which is perpendicular to air-bearing surface 505A.

Emitting oscillator 572A is disposed down track (+y) from receiving oscillator 571A, and electric field barrier 573A is disposed down track (+y) from receiving oscillator 571A and emitting oscillator 572A. Receiving oscillator 571A and emitting oscillator 572A are separated by a coupling length $L_{C-RE}$ in the down-track (y) dimension of HAMR head 540A. $L_{C-RE}$ is a distance between a surface $571A_{S2}$ of receiving oscillator 571A and a surface $572A_{S3}$ of emitting oscillator 572A. In some examples, surface $571A_{S2}$ is substantially orthogonal to air-bearing surface 505A and substantially perpendicular to down-track dimension y. In some examples, surface $572A_{S3}$ is substantially orthogonal to air-bearing surface 505A and substantially perpendicular to down-track dimension y.

Electric field barrier 573A includes a surface $573A_S$. In some examples, surface $573A_S$ is substantially parallel to surface $571A_{S2}$ of receiving oscillator 571A. Surface $571A_{S2}$ of receiving oscillator 571A and surface $573A_S$ of electric field barrier 573A are separated by a coupling length $L_{C-RB}$ in the down track dimension y. Coupling length $L_{C-RB}$ is equal to coupling length $L_{C-RE}$ separating receiving oscillator 571A and emitting oscillator 572A in the down-track dimension, plus the down-track height $EO_{DT}$ of emitting oscillator 572A. That is, receiving oscillator 571A and electric field barrier 573A are separated by coupling length $L_{C-RB}$ in the down-track (y) dimension of HAMR head 540A.

Figure 5A:
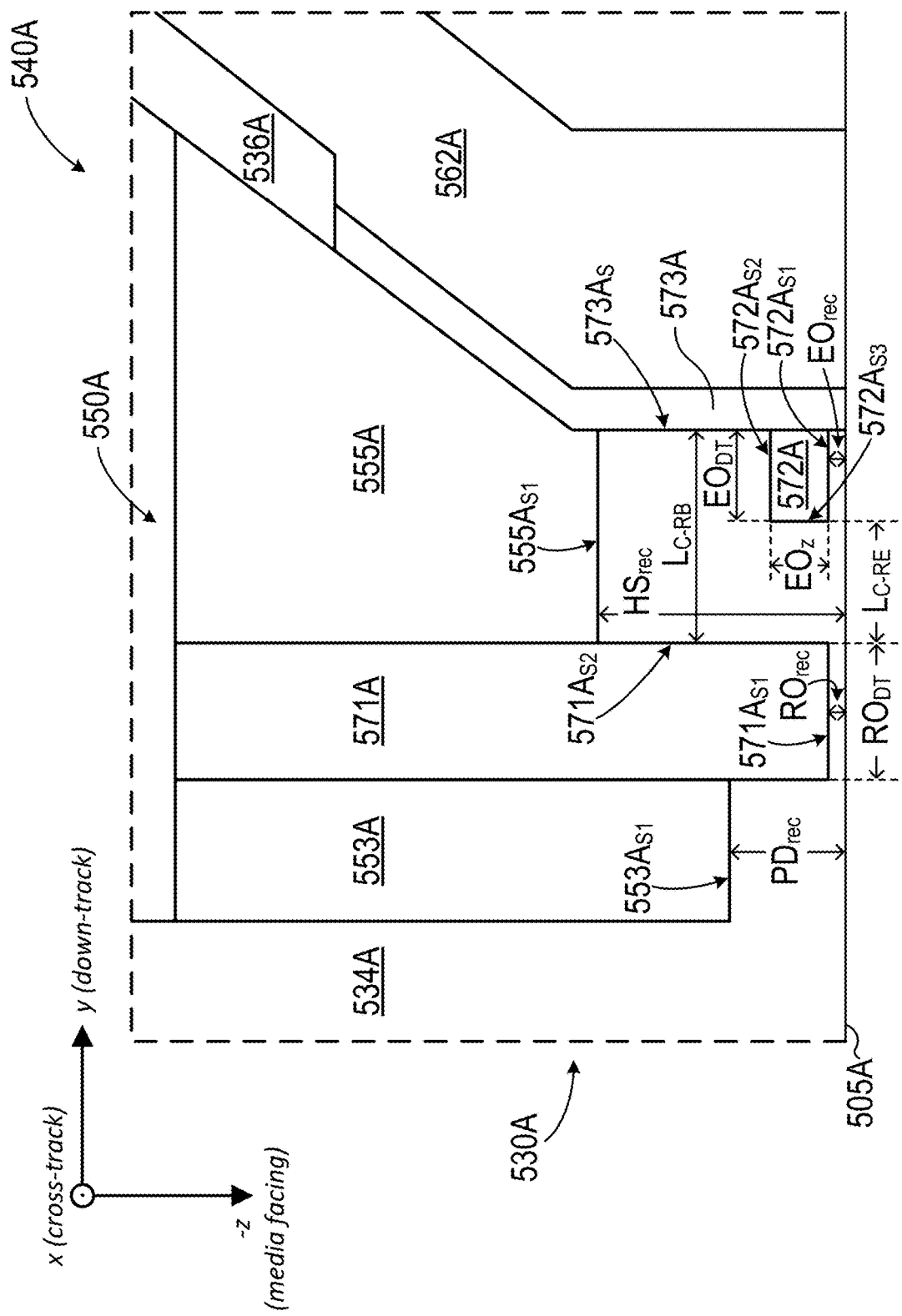
FIGS. 5A-5D are cross-sectional views of example HAMR heads, in accordance with aspects of this disclosure.
Figure 5B:
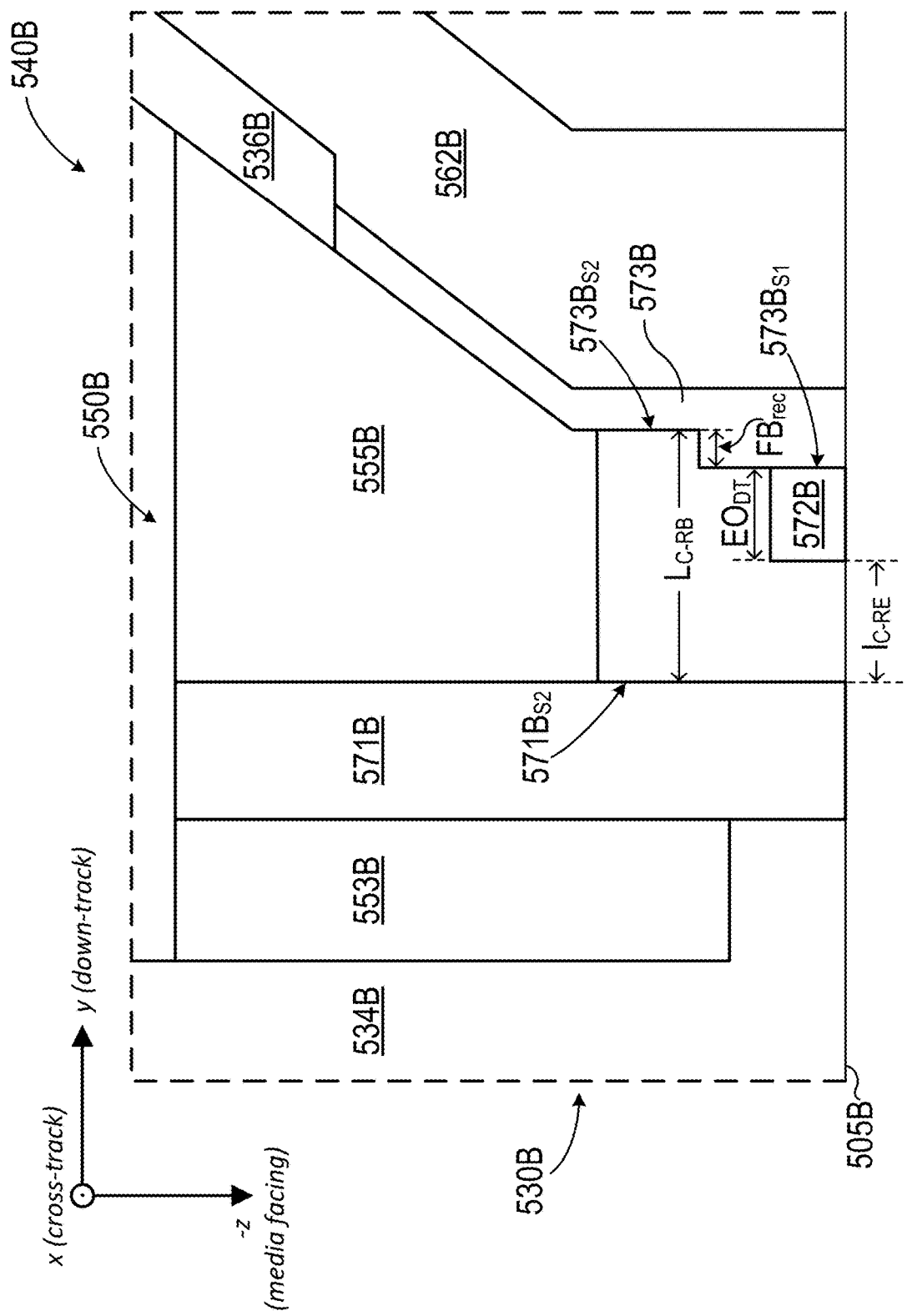

HAMR head 540B of FIG. 5B includes a waveguide 530B, an NFT 550B, a write pole 562B, and a diffuser 536B. NFT 550B includes a plasmonic disk 553B, a heat sink 555B, a receiving oscillator 571B, an electric field barrier 573B, and an emitting oscillator 572B. Plasmonic disk 553B, receiving oscillator 571B, heat sink 555B, and emitting oscillator 572B of HAMR head 540B are defined by similar surfaces and dimensions (i.e., recess lengths, down-track heights, lengths, and coupling lengths) as the similar features of HAMR heat 540A of FIG. 5A. Receiving oscillator 571B and emitting oscillator 572B are separated by a coupling length $L_{C-RE}$ in the down-track (y) dimension of HAMR head 540B.

Receiving oscillator 571B includes a surface $571B_{S2}$. In some examples, surface $571B_{S2}$ is substantially orthogonal to air-bearing surface 505B and substantially perpendicular to down-track dimension y. Electric field barrier 573B includes surfaces $573B_{S1}$ and $573B_{S2}$. In some examples, surfaces $573B_{S1}$ and/or $573B_{S2}$ are substantially parallel to surface $571B_{S2}$ of receiving oscillator 571B. Surfaces $573B_{S1}$ and $573B_{S2}$ are separated by an electric field barrier recess length $FB_{rec}$ which defines a down-track recess of electric field barrier 573B. Surface $571B_{S2}$ of receiving oscillator 571B and surface $573B_{S2}$ of electric field barrier 573B are separated by a coupling length $L_{C-RB}$ in the down-track dimension. Coupling length $L_{C-RB}$ is approximately equal to a coupling length $L_{C-RE}$ separating receiving oscillator 571B and emitting oscillator 572B in the down-track dimension, plus a down-track height $EO_{DT}$ of emitting oscillator 572B, plus recess length $FB_{rec}$ of the down-track recess of electric field barrier 573B.

Figure 5C:
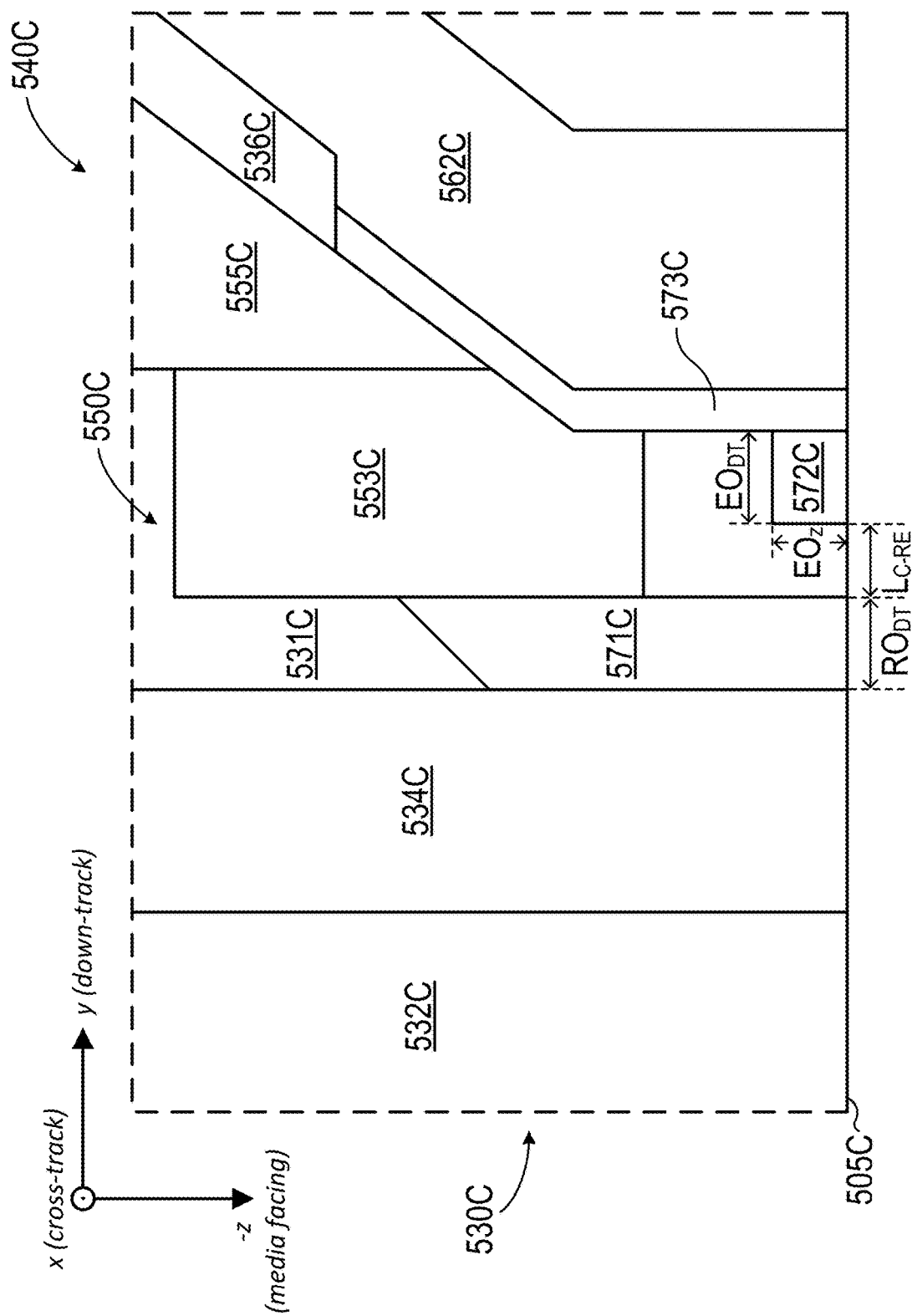

HAMR head 540C of FIG. 5C includes a waveguide 530C, an NFT 550C, a write pole 562C, and a diffuser 536C. NFT 550C includes a plasmonic disk (DSC) 553C, a heat sink 555C, a receiving oscillator 571C, an electric field barrier 573C, and an emitting oscillator 572C. Receiving oscillator 571C is disposed between and operatively coupled to a core-to-NFT spacing (CNS) layer 534C of waveguide 530C, and plasmonic disk 553C. In an up-track (−y) direction, plasmonic disk 553C is disposed proximate to and operatively coupled to a cladding layer 531C of waveguide 530C, and receiving oscillator 571C. In a down-track (+y) direction, plasmonic disk 553C is disposed proximate to and operatively coupled to heat sink 555C and electric field barrier 573C.

Emitting oscillator 572C is disposed down track (+y) from receiving oscillator 571C. Receiving oscillator 571C and emitting oscillator 572C are separated by a coupling length $L_{C\text{-}RE}$ in the down-track (+y) dimension of HAMR head 540C. Receiving oscillator 571C is defined by a height $RO_{DT}$ in the down-track (y) dimension of HAMR head 540C. Emitting oscillator 572C is defined by a height $EO_{DT}$ in the down-track (y) dimension of HAMR head 540C and an emitting oscillator length $EO_z$ in a dimension z which is perpendicular to a media-facing air-bearing surface 505C.

Figure 5D:
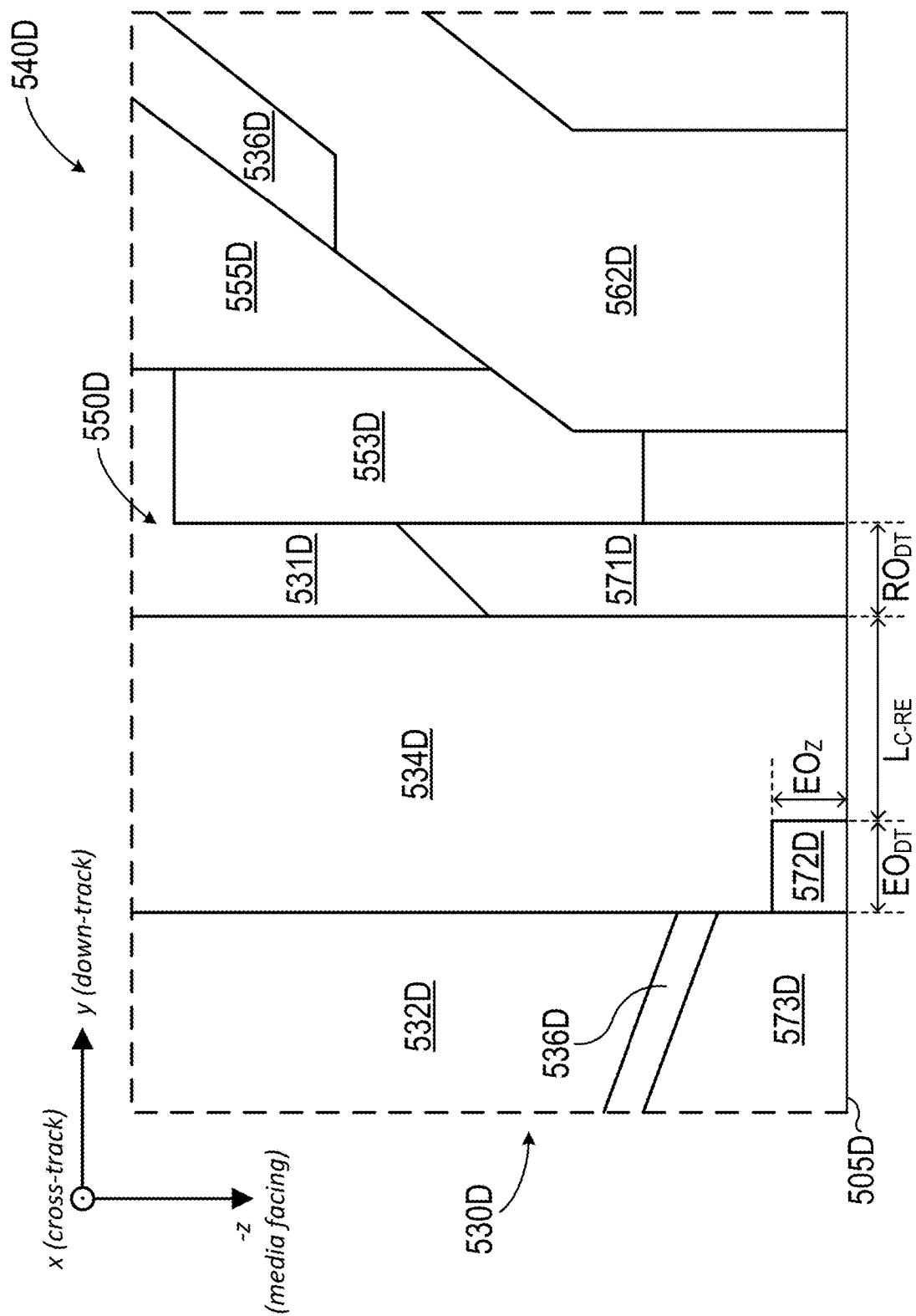

HAMR head 540D of FIG. 5D includes a waveguide 530D, an NFT 550D, a write pole 562D, and a diffuser 536D. NFT 550D includes a plasmonic disk (DSC) 553D, a heat sink disk (heat sink) 555D, a receiving oscillator 571D, an electric field barrier 573D, and an emitting oscillator 572D.

Emitting oscillator 572D of HAMR head 540D is disposed up track (−y) from receiving oscillator 571D. Receiving oscillator 571D and emitting oscillator 572D are separated by a coupling length $L_{C\text{-}RE}$ in the down-track (y) dimension of HAMR head 540D. Receiving oscillator 571D is defined by a height $RO_{DT}$ in the down-track (y) dimension of HAMR head 540D. Emitting oscillator 572D is defined by a height $EO_{DT}$ in the down-track (y) dimension of HAMR head 540D and an emitting oscillator length $EO_z$ in a dimension z which is perpendicular to a media-facing air-bearing surface 505D.

The dimensions associated with receiving oscillators, emitting oscillators, and/or electric field barriers in the examples of FIGS. 5A-5D may be defined to enable aspects of the near field generation, transfer of a near field from a receiving oscillator to an emitting oscillator, and/or the confinement of the transferred near field to the emitting oscillator. For example, recesses such as $PD_{rec}$ of a plasmonic disk and $HS_{rec}$ of a heat sink may be dimensioned to isolate an end of a respective receiving oscillator which is proximate to an air-bearing surface of the associated HAMR head. The isolation of the end of the receiving oscillator may provide a near field that generates a higher thermal gradient hot spot on a magnetic disk surface than a HAMR head with a traditional near-field emitter such as a peg.

In some examples, a receiving oscillator and/or an emitting oscillator are recessed from an associated air-bearing surface. A receiving oscillator may be recessed from an air-bearing surface by a recess length $RO_{rec}$. An emitting oscillator may be recessed from an air-bearing surface by a recess length of $EO_{rec}$. A recess length $RO_{rec}$ may provide isolation to an end of the receiving oscillator which is proximate to an air-bearing surface of the associated HAMR head. In some examples, a receiving oscillator recess $RO_{rec}$ and/or an emitting oscillator recess $EO_{rec}$ are dimensioned to enable near field transfer from the receiving oscillator to the emitting oscillator (e.g., near field transfer 493 of FIG. 4), and/or enable emission of the near field from the emitting oscillator (e.g., near field emission 494 of FIG. 4) of the associated HAMR head. In some examples, a length of a surface of a receiving oscillator from a media-facing air-bearing surface, that is, a recess length $RO_{rec}$ of the receiving oscillator, is about zero. In some examples, a length of a surface of an emitting oscillator from a media-facing air-bearing surface, that is, a recess length $EO_{rec}$ of the emitting oscillator, is about zero. In some examples, dimensioning recess lengths $RO_{rec}$, and in particular $EO_{rec}$, to be at or near zero increases the thermal gradient and/or increase the emitted near field strength relative to a similar head which does not include recess lengths of a receiving oscillator and/or emitting oscillator dimensioned to be at or near zero.

Down-track heights $RO_{DT}$ and $EO_{DT}$ of a receiving oscillator and an emitting oscillator, an emitting oscillator length $EO_z$ of an emitting oscillator, and coupling length $L_{C\text{-}RE}$ between a receiving oscillator and an emitting oscillator is, in some examples, dimensioned to support generation of a near field with a high thermal gradient and/or small spot size. In some instances, $RO_{DT}$, $EO_{DT}$, $L_{C\text{-}RE}$, and/or $EO_z$ are dimensioned to support the transfer of a near field from a receiving oscillator to an emitting oscillator, enable confinement of a near field on an emitting oscillator, and/or enable emission of a near field with a small spot size from an emitting oscillator. In some examples, a down-track height $RO_{DT}$ of a receiving oscillator is from about 10 nanometers to about 25 nanometers. In some examples, a down-track height $RO_{DT}$ of a receiving oscillator is from about 10 nanometers to about 15 nanometers. In some examples, a down-track height ROOT of a receiving oscillator is from about 8 nanometers to about 15 nanometers.

Down-track coupling length $L_{C\text{-}RE}$ between a receiving oscillator and an emitting oscillator may be dimensioned to enable transfer of a near field from the receiving oscillator to the emitting oscillator. In some examples, a coupling length $L_{C\text{-}RE}$ between a receiving oscillator and an emitting oscillator in a down-track dimension is less than about 15 nanometers. In some examples, a coupling length $L_{C\text{-}RE}$ between a receiving oscillator and an emitting oscillator in a down-track dimension is from about 3 nanometers to about 6 nanometers.

A down-track coupling length $L_{C\text{-}RB}$ between a receiving oscillator and an electric field barrier and a recess $HS_{rec}$ of a heat sink may form a dielectric cavity. That is, a dielectric cavity may be a volume which is enclosed by a surface of a receiving oscillator, a surface of a heat sink, a surface of an electric field barrier, and a surface of an emitting oscillator (e.g., surfaces $571A_{S2}$, $555A_{S1}$, $573A_S$, and $572A_{S2}$ of FIG. 5A). A dielectric cavity may place an electric field anti-node near a media-facing surface for improved thermal gradient and plasmonic efficiency. In some examples, a coupling length IC-RB between a receiving oscillator and an electric field barrier in a down-track dimension is from about 14 nanometers to about 25 nanometers. In some examples, a recess $HS_{rec}$ of a heat sink is from about 60 nanometers to about 160 nanometers. In some examples, a recess $HS_{rec}$ of a heat sink is from about 120 nanometers to about 150 nanometers.

Figure 6C:
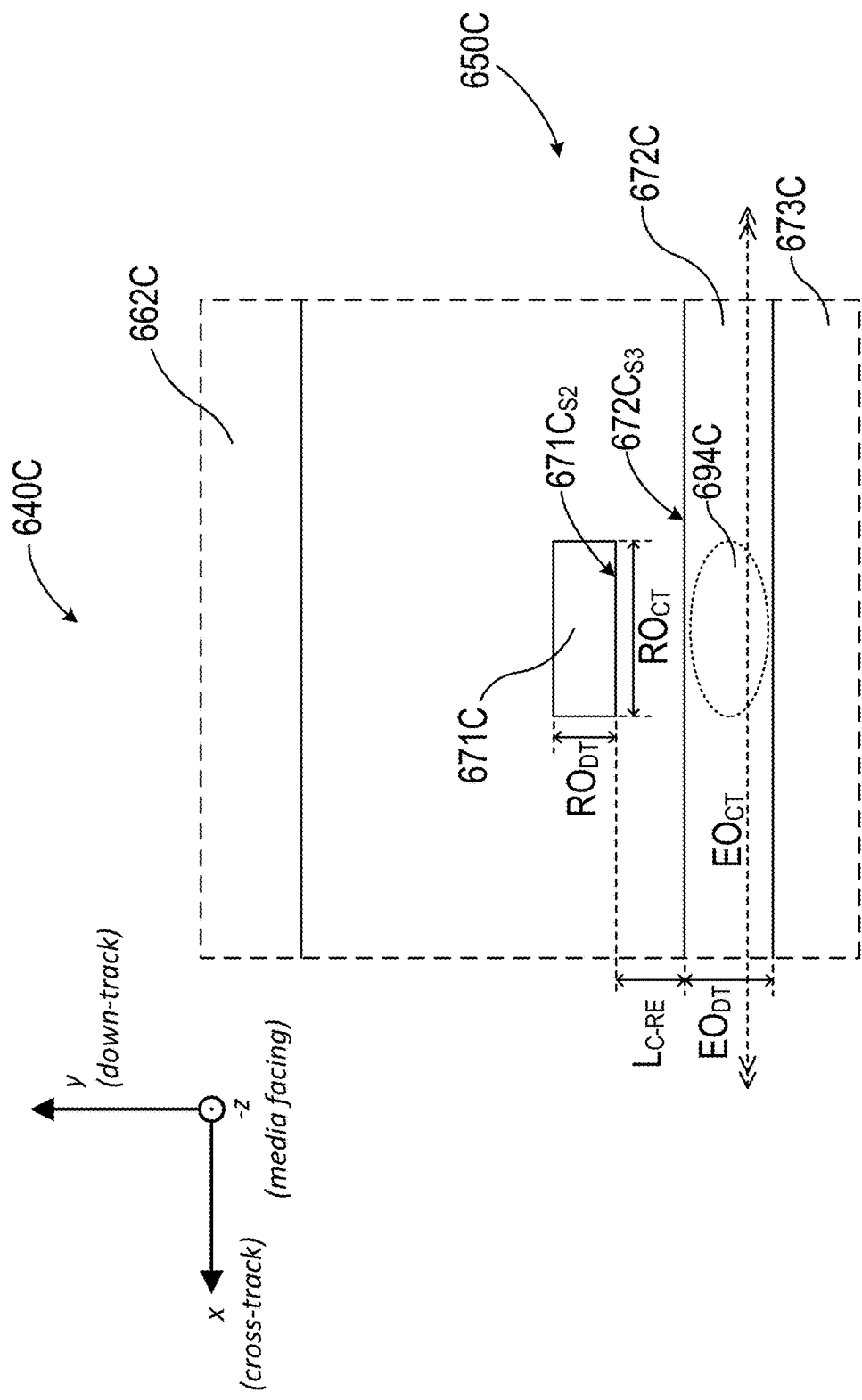

FIGS. 6A-6C are schematic views parallel to an air-bearing surface of an example HAMR head, in accordance with aspects of this disclosure. HAMR head 640A of FIG.

6A includes an NFT 650A and a write pole 662A. NFT 650A includes a receiving oscillator 671A, an emitting oscillator 672A, and an electric field barrier 673A. Electric field barrier 673A is disposed proximate to and operatively coupled to write pole 662A. Emitting oscillator 672A is disposed proximate to and operatively coupled to electric field barrier 673A. Emission of a near field 694A is shown from emitting oscillator 672A.

Emitting oscillator 672A is disposed down track (+y) from receiving oscillator 671A, and electric field barrier 673A is disposed down track (+y) from receiving oscillator 671A and emitting oscillator 672A. Receiving oscillator 671A and emitting oscillator 672A are separated by a coupling length $L_{C-RE}$ in the down-track (y) dimension of HAMR head 640A. $L_{C-RE}$ is a distance between a surface 671$A_{S2}$ of receiving oscillator 671A and a surface 672$A_{S3}$ of emitting oscillator 672A. In some examples, surface 671$A_{S2}$ is substantially parallel to surface 672$A_{S3}$.

Receiving oscillator 671A is defined by a height $RO_{DT}$ in the down-track (y) dimension and a cross-track width $RO_{CT}$ in the cross-track (x) dimension of HAMR head 640A. Emitting oscillator 672A is defined by a height $EO_{DT}$ in the down-track (y) dimension and a cross-track width $EO_{CT}$ in the cross-track (x) dimension of HAMR head 640A. In this example, cross-track width $EO_{CT}$ of emitting oscillator 672A extends beyond the view represented in FIG. 6A.

HAMR head 640B of FIG. 6B includes an NFT 650B and a write pole 662B. NFT 650B includes a receiving oscillator 671B, an emitting oscillator 672B, and an electric field barrier 673B. Electric field barrier 673B is disposed proximate to and operatively coupled to write pole 662B. Emitting oscillator 672B is disposed proximate to and operatively coupled to electric field barrier 673B. Emission of a near field 694B is shown from emitting oscillator 672B.

Emitting oscillator 672B is disposed down track (+y) from receiving oscillator 671B, and electric field barrier 673B is disposed down track (+y) from receiving oscillator 671B and emitting oscillator 672B. Receiving oscillator 671B and emitting oscillator 672B are separated by a coupling length $L_{C-RE}$ in the down-track (y) dimension of HAMR head 640B. $L_{C-RE}$ is a distance between a surface 671$B_{S2}$ of receiving oscillator 671B and a surface 672$B_{S3}$ of emitting oscillator 672B. In some examples, surface 671$B_{S2}$ is substantially parallel to surface 672$B_{S3}$.

Receiving oscillator 671B is defined by a height $RO_{DT}$ in the down-track (y) dimension and a cross-track width $RO_{CT}$ in the cross-track (x) dimension of HAMR head 640B. Emitting oscillator 672B is defined by a height $EO_{DT}$ in the down-track (y) dimension and a cross-track width $EO_{CT}$ in the cross-track (x) dimension of HAMR head 640B.

HAMR head 640C of FIG. 6C includes an NFT 650C and a write pole 662C. NFT 650C includes a receiving oscillator 671C, an emitting oscillator 672C, and an electric field barrier 673C. Emitting oscillator 672C is disposed proximate to and operatively coupled to electric field barrier 673C. Emission of a near field 694C is shown from emitting oscillator 672C.

Emitting oscillator 672C is disposed up track (−y) from receiving oscillator 671C, and electric field barrier 673C is disposed up track (−y) from receiving oscillator 671C and emitting oscillator 672C. Receiving oscillator 671C is disposed up track (−y) from write pole 662C. Receiving oscillator 671C and emitting oscillator 672C are separated by a coupling length $L_{C-RE}$ in the down-track (y) dimension of HAMR head 640C. $L_{C-RE}$ is a distance between a surface 671$C_{S2}$ of receiving oscillator 671C and a surface 672$C_{S3}$ of emitting oscillator 672C. In some examples, surface 671$C_{S2}$ is substantially parallel to surface 672$C_{S3}$.

Receiving oscillator 671C is defined by a height $RO_{DT}$ in the down-track (y) dimension and a cross-track width $RO_{CT}$ in the cross-track (x) dimension of HAMR head 640C. Emitting oscillator 672C is defined by a height $EO_{DT}$ in the down-track (y) dimension and a cross-track width $EO_{CT}$ in the cross-track (x) dimension of HAMR head 640C. In this example, cross-track width $EO_{CT}$ of emitting oscillator 672C extends beyond the view represented in FIG. 6C.

Down-track heights $RO_{DT}$ and $EO_{DT}$ and cross-track widths $RO_{CT}$ and $EO_{CT}$ of a receiving oscillator and an emitting oscillator (e.g., $RO_{DT}$ and $RO_{CT}$ of receiving oscillator 671A and $EO_{DT}$ and $EO_{CT}$ of emitting oscillator 672A of FIG. 6A, respectively) is, in some examples, dimensioned to support generation of a strong near field with a high thermal gradient and or small spot size, support transfer of a near field from a receiving oscillator to an emitting oscillator, enable confinement of a near field on an emitting oscillator, and/or enable emission of a near field with a small spot size from an emitting oscillator. Down-track coupling lengths $L_{C-RE}$ between a receiving oscillator and an emitting oscillator may be dimensioned to enable transfer of a near field from the receiving oscillator to the emitting oscillator.

Cross-track width $EO_{CT}$ of an emitting oscillator (e.g., $EO_{CT}$ of emitting oscillator 672A, 672B, or 672C of FIGS. 6A, 6B, and 6C, respectively) is, in some examples, dimensioned to promote dissipation of heat resulting from an emitted near field (e.g., emitted near fields 694A, 694B, or 694C or FIGS. 6A, 6B, and 6C, respectively). In some examples, generated heat is dissipated through channels through a write pole (e.g., write pole 662A of FIG. 6A), a diffuser (e.g., diffuser 536A of FIG. 5A), and/or through other heat sink structures and/or dissipation channels. In the examples of HAMR heads 640A, 640B, and 640C of FIGS. 6A, 6B, and 6C, an area of contact between an emitting oscillator and another feature may define the rate of heat dissipation from the emitting oscillator. For example, emitting oscillator 672A of FIG. 6A is thermally coupled to electric field barrier along an interface 673$A_{I1}$. In some examples, an emitting oscillator is thermally coupled to other features such as an optical side shield. Electric field barrier 673A is further thermally coupled to write pole 662A along an interface 673$A_{I2}$. Thermal coupling may include being physically coupled such that heat can be transferred to a feature and then dissipated away from a feature. Heat dissipation away from emitting oscillator 672A may be defined in part by areas if direct or indirect contact with dissipation paths through electric field barrier 673A, write pole 662A, and/or other features (e.g., a diffuser or heat sink). The area of contact between emitting oscillator 672A and electric field barrier 673A is defined by the cross-track width $EO_{CT}$ and a length (similar to emitting oscillator length $EO_z$ of FIG. 5A). A large area of contact of an emitting oscillator with a feature may, in some scenarios, enable a higher rate of heat dissipation, and thus a lower operating temperature, than a small area of contact of an emitting oscillator with a feature. The higher rate of heat dissipation may provide a HAMR head with better reliability and/or a longer lifetime by maintaining a lower operating temperature.

The cross-sectional size of an emitted near field (e.g., emitted near field 694A of FIG. 6A) may be defined by a cross-track width $RO_{CT}$ and a down-track height $RO_{DT}$ of a receiving oscillator (e.g., $RO_{CT}$ and $RO_{DT}$ of FIG. 6A) as well as other features such as an optical side shield. A near field with a small cross-section (e.g., a small ellipticallyshaped cross-section) may enable smaller bits with a sharp magnetic transition to be written to a storage layer of a magnetic disk, and thus may enable a higher areal density capability. However, a receiving oscillator with a small cross-track width $RO_{CT}$ and/or down-track height $RO_{DT}$ may provide lower heat dissipation and thus higher operating temperature than a receiving oscillator with a large cross-track width and/or down-track height. Transferring a generated near field from a receiving oscillator to an emitting oscillator enables the receiving oscillator to have smaller dimensions to provide a small emitted near field, and enables the emitting oscillator to have larger dimensions to provide more contact area with a surrounding feature and enable more efficient heat dissipation than would be provided by the receiving oscillator. That is, a HAMR head with a near-field oscillating pair which includes a receiving oscillator and an emitting oscillator may enable the near field generating portion (i.e., the receiving oscillator) and the near field emitting portion (i.e., the emitting oscillator) to be dimensioned independently in order to provide a lower NFT temperature while maintain higher ADC than a HAMR which does not include a near-field oscillating pair.

In some example HAMR heads, a cross-track width $EO_{CT}$ of an emitting oscillator is wider than a cross-track width $RO_{CT}$ of a receiving oscillator. In one example HAMR head, a cross-track width $EO_{CT}$ of an emitting oscillator is at least three times greater than a cross-track width $RO_{CT}$ of a receiving oscillator.

Figure 7A:
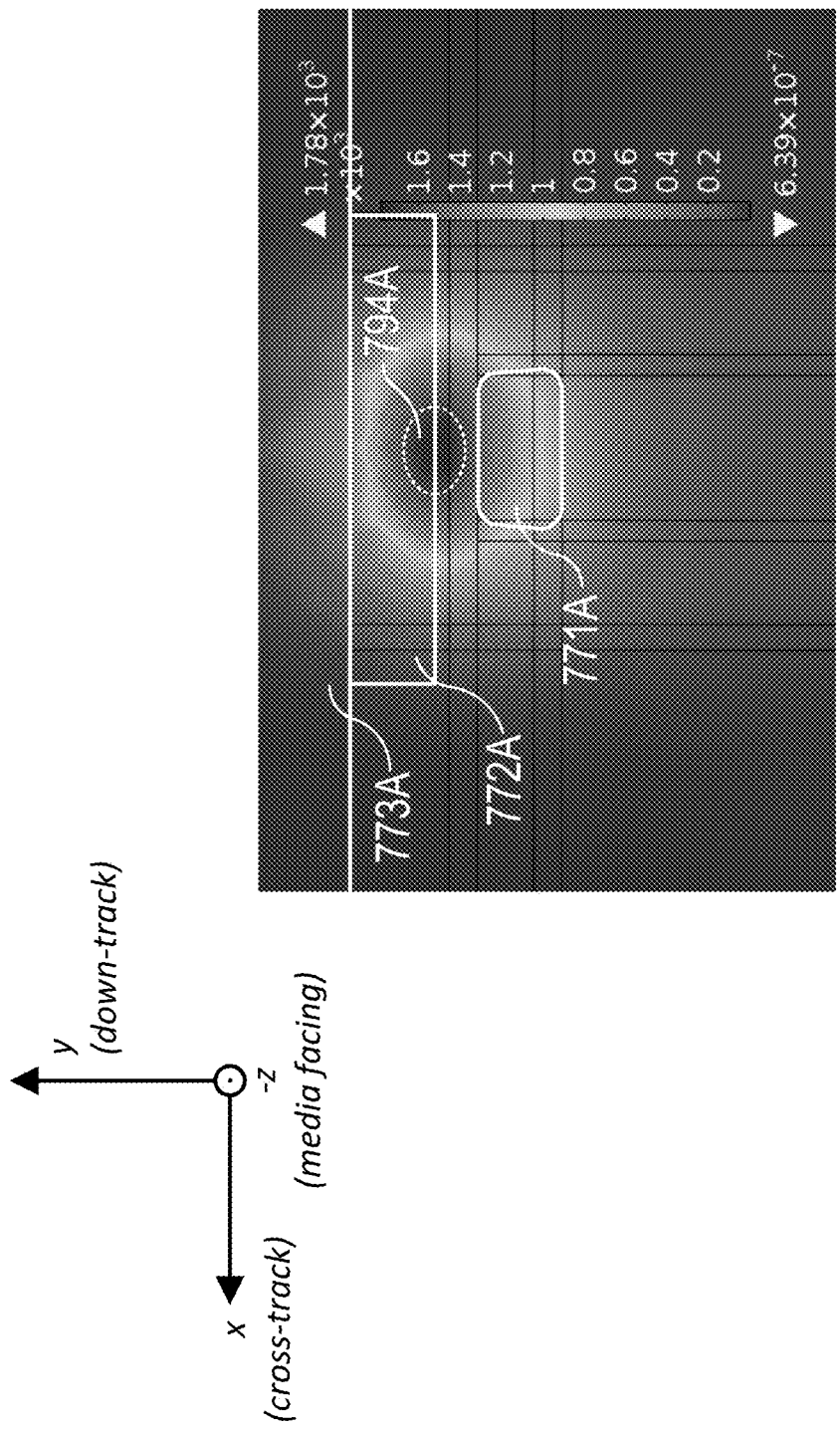
FIG. 7A is a modeled contour image of a resistive heat profile in a storage layer of an example magnetic disk of an example HAMR head overlaid with outlines of features of an example HAMR head, in accordance with aspects of this disclosure.
Figure 7B:
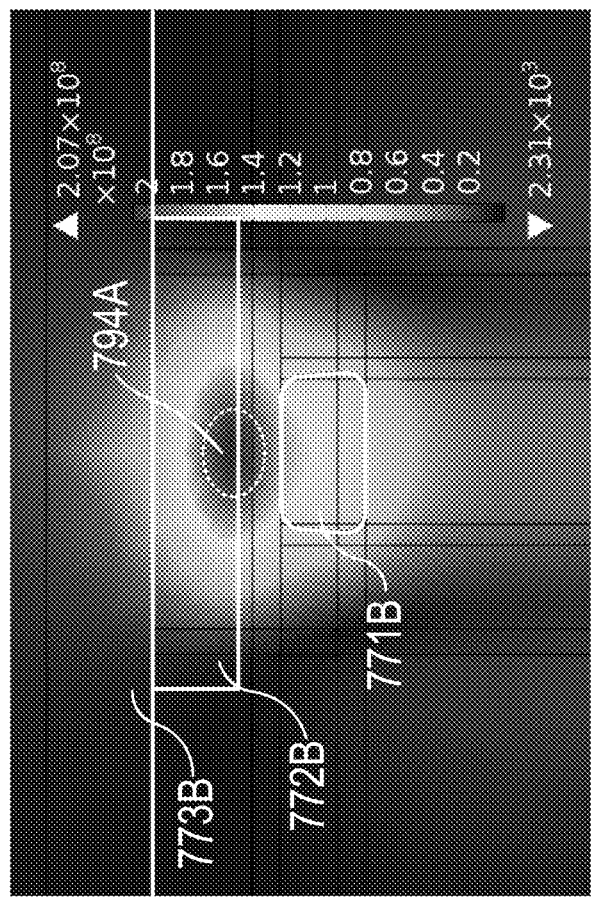
FIG. 7B is a modeled contour image of an a profile of a longitudinal component of an electric field profile of an example HAMR head overlaid with outlines of features of an example HAMR head, in accordance with aspects of this disclosure.
Figure 8:
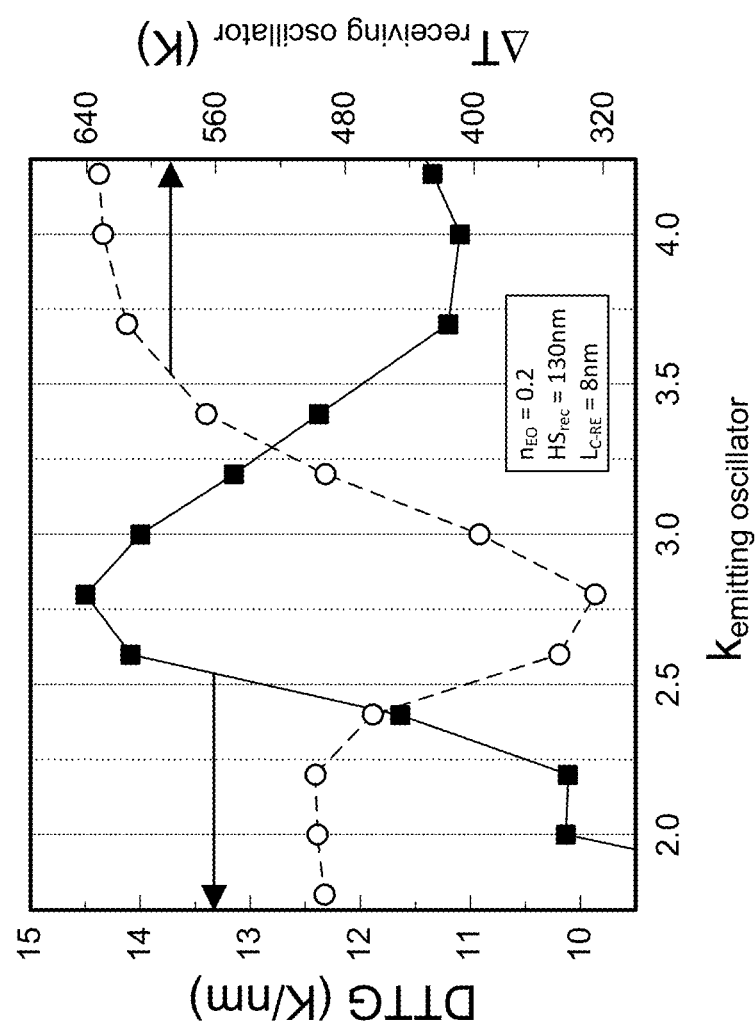
FIG. 8 is a plot of modeled down-track thermal gradient in a storage layer of a magnetic disk and a temperature change rise of the an associated receiving oscillator near a media-facing air-bearing surface versus extinction coefficient of the emitting oscillator material, in accordance with aspects of this disclosure.

Performance metrics of example HAMR heads including near-field oscillator pairs were modeled and are reported in FIGS. 7A-8.

FIG. 7A is a modeled contour image of a resistive heat profile in a storage layer of an example magnetic disk overlaid with outlines of features of an example HAMR head, in accordance with aspects of this disclosure. The perspective displayed is parallel to an air-bearing surface of an example HAMR head. Locations of a receiving oscillator 771A, an emitting oscillator 772A, and an electric field barrier 773A are overlayed on the contour image. Emitting oscillator 772A is disposed down track (+y) from receiving oscillator 771A and is coupled to electric field barrier 773A. The resistive heat profile shows a thermal spot centered on an emitted near field 794A from emitting oscillator 772A.

FIG. 7B is a modeled contour image of a profile of a longitudinal component of an electric field (e.g. an electric field component normal to a media facing air-bearing surface) overlaid with outlines of features of an example HAMR head, in accordance with aspects of this disclosure. The perspective displayed is parallel to an air-bearing surface of an example HAMR head. Locations of a receiving oscillator 771B, an emitting oscillator 772B, and an electric field barrier 773B are overlayed on the contour image. Emitting oscillator 772B is disposed down track (+y) from receiving oscillator 771B and is coupled to electric field barrier 773B. The electric field contour profile shows the emission of a near field 794B from emitting oscillator 772B.

FIG. 8 is a plot of modeled down-track thermal gradient in a storage layer of a magnetic disk and a temperature rise of an associated receiving oscillator near a media-facing air-bearing surface versus extinction coefficient of the emitting oscillator material, in accordance with aspects of this disclosure. The dependence of the down-track thermal gradient (DTTG, K/nm) and temperature increase of a receiving oscillator ($\Delta T$, K) on an optical extinction coefficient $k_{EO}$ of a material of an emitting oscillator is reflected on the y axes. An extinction coefficient $k_{EO}$ of about 2.8 may provide a relatively high down-track thermal gradient and relatively low temperature rise of the receiving oscillator, suggesting a good transfer of a near field to the emitting oscillator of this example configuration. As shown in the example of FIG. 8, the optical characteristics of the receiving oscillator and emitting oscillator may enable near field transfer from a receiving oscillator to an emitting oscillator.

What is claimed is:

1. A heat-assisted magnetic recording head comprising a near-field transducer comprising:
   a plasmonic disk; and
   a near-field oscillator pair comprising:
      a receiving oscillator operatively coupled to the plasmonic disk and configured to receive localized surface plasmons from the plasmonic disk and amplify a near field of the localized surface plasmons; and
      an emitting oscillator configured to receive the near field from the receiving oscillator and emit the near field toward a surface of a magnetic disk,
   wherein the receiving oscillator and the emitting oscillator are separated by a coupling length in a down-track dimension of the heat-assisted magnetic recording head.

2. The heat-assisted magnetic recording head of claim 1, wherein the coupling length in the down-track dimension is less than about 15 nanometers.

3. The heat-assisted magnetic recording head of claim 1, wherein the emitting oscillator has an optical extinction coefficient that is lower than an optical extinction coefficient of the receiving oscillator.

4. The heat-assisted magnetic recording head of claim 1,
   wherein the emitting oscillator has an emitting oscillator optical ratio that is defined by an optical extinction coefficient of the emitting oscillator divided by a refractive index of the emitting oscillator,
   wherein the receiving oscillator has a receiving oscillator optical ratio that is defined by an optical extinction coefficient of the receiving oscillator divided by a refractive index of the receiving oscillator, and
   wherein the emitting oscillator optical ratio is greater than the receiving oscillator optical ratio.

5. The heat-assisted magnetic recording head of claim 1, wherein the near-field transducer further comprises an electric field barrier which is thermally coupled to the emitting oscillator and is configured to confine the near field to the emitting oscillator after the emitting oscillator receives the near field from the receiving oscillator.

6. The heat-assisted magnetic recording head of claim 5, wherein the electric field barrier comprises a material having an optical extinction coefficient that is larger than an optical extinction coefficient of the material that the emitting oscillator comprises.

7. The heat-assisted magnetic recording head of claim 5 further comprising a write pole, wherein the electric field barrier is thermally coupled to the write pole.

8. The heat-assisted magnetic recording head of claim 1, wherein the receiving oscillator and the emitting oscillator are disposed proximal to a media-facing air-bearing surface of the heat-assisted magnetic recording head.

9. The heat-assisted magnetic recording head of claim 8, wherein the receiving oscillator comprises a surface which is substantially parallel to and coincident with the media-facing air-bearing surface.

10. The heat-assisted magnetic recording head of claim 8, wherein the emitting oscillator comprises a surface which is substantially parallel to and coincident with the media-facing air-bearing surface.

11. The heat-assisted magnetic recording head of claim 1,
wherein the receiving oscillator is defined by a downtrack height and a cross-track width, and
wherein the emitting oscillator is defined by a down-track height and a cross-track width.

12. The heat-assisted magnetic recording head of claim 11, wherein the cross-track width of the emitting oscillator is at least three times greater than the cross-track width of the receiving oscillator.

13. A heat-assisted magnetic recording head comprising a near-field transducer comprising:
   a plasmonic disk; and
   a near-field oscillator pair comprising:
      a receiving oscillator operatively coupled to the plasmonic disk and configured to receive localized surface plasmons from the plasmonic disk and amplify a near field of the localized surface plasmons; and
      an emitting oscillator configured to receive the near field from the receiving oscillator and emit the near field toward a surface of a magnetic disk,
   wherein the emitting oscillator has an optical extinction coefficient that is lower than an optical extinction coefficient of the receiving oscillator.

14. The heat-assisted magnetic recording head of claim 13, wherein the optical extinction coefficient of the emitting oscillator is less than or equal to about 4.

15. The heat-assisted magnetic recording head of claim 13, wherein the emitting oscillator has a refractive index that is less than or equal to about 1.

16. The heat-assisted magnetic recording head of claim 13,
wherein the emitting oscillator has an emitting oscillator optical ratio that is defined by the optical extinction coefficient of the emitting oscillator divided by a refractive index of the emitting oscillator,
wherein the receiving oscillator has a receiving oscillator optical ratio that is defined by the optical extinction coefficient of the receiving oscillator divided by a refractive index of the receiving oscillator, and
wherein the emitting oscillator optical ratio is greater than the receiving oscillator optical ratio.

17. A heat-assisted magnetic recording head comprising a near-field transducer comprising:
   a plasmonic disk; and
   a near-field oscillator pair comprising:
      a receiving oscillator operatively coupled to the plasmonic disk and configured to receive localized surface plasmons from the plasmonic disk and amplify a near field of the localized surface plasmons; and
      an emitting oscillator configured to receive the near field from the receiving oscillator and emit the near field toward a surface of a magnetic disk,
   wherein the near-field transducer further comprises an electric field barrier which is thermally coupled to the emitting oscillator and is configured to confine the near field to the emitting oscillator after the emitting oscillator receives the near field from the receiving oscillator.

18. The heat-assisted magnetic recording head of claim 17, wherein the electric field barrier comprises a material having an optical extinction coefficient that is larger than an optical extinction coefficient of the material that the emitting oscillator comprises.

19. The heat-assisted magnetic recording head of claim 17, wherein the electric field barrier comprises a material having an optical extinction coefficient that is greater than or equal to about 6.

20. The heat-assisted magnetic recording head of claim 17 further comprising a write pole, wherein the electric field barrier is thermally coupled to the write pole.

\* \* \* \* \*